INVENTOR
ALLAN GREENBERG
BY John C. Black
ATTORNEY

SHIFT REGISTER STORAGE DEVICE

Filed Oct. 22, 1965

2 Sheets-Sheet 2

3,383,521
SHIFT REGISTER STORAGE DEVICE
Allan Greenberg, Binghamton, N.Y., assignor to International Business Machines Corporation, Armonk, N.Y., a corporation of New York
Filed Oct. 22, 1965, Ser. No. 502,009
7 Claims. (Cl. 307—221)

ABSTRACT OF THE DISCLOSURE

This invention relates generally to an improved data storage means; and more particularly, to an improved high speed shift register which is low in cost and adapted for monolithic fabrication. The improved register includes first and second controlled rectifiers per stage, each rectifier having a logical AND circuit coupled to its input. First and second data advance lines couple pulses alternately to the AND circuits of the first and second rectifiers to advance data bits into the second then the first rectifiers during succeeding half cycles of operation. First and second clear lines couple turn-off pulses alternately to the first and second rectifiers after data therein is transferred to succeeding rectifiers.

Figure 1:
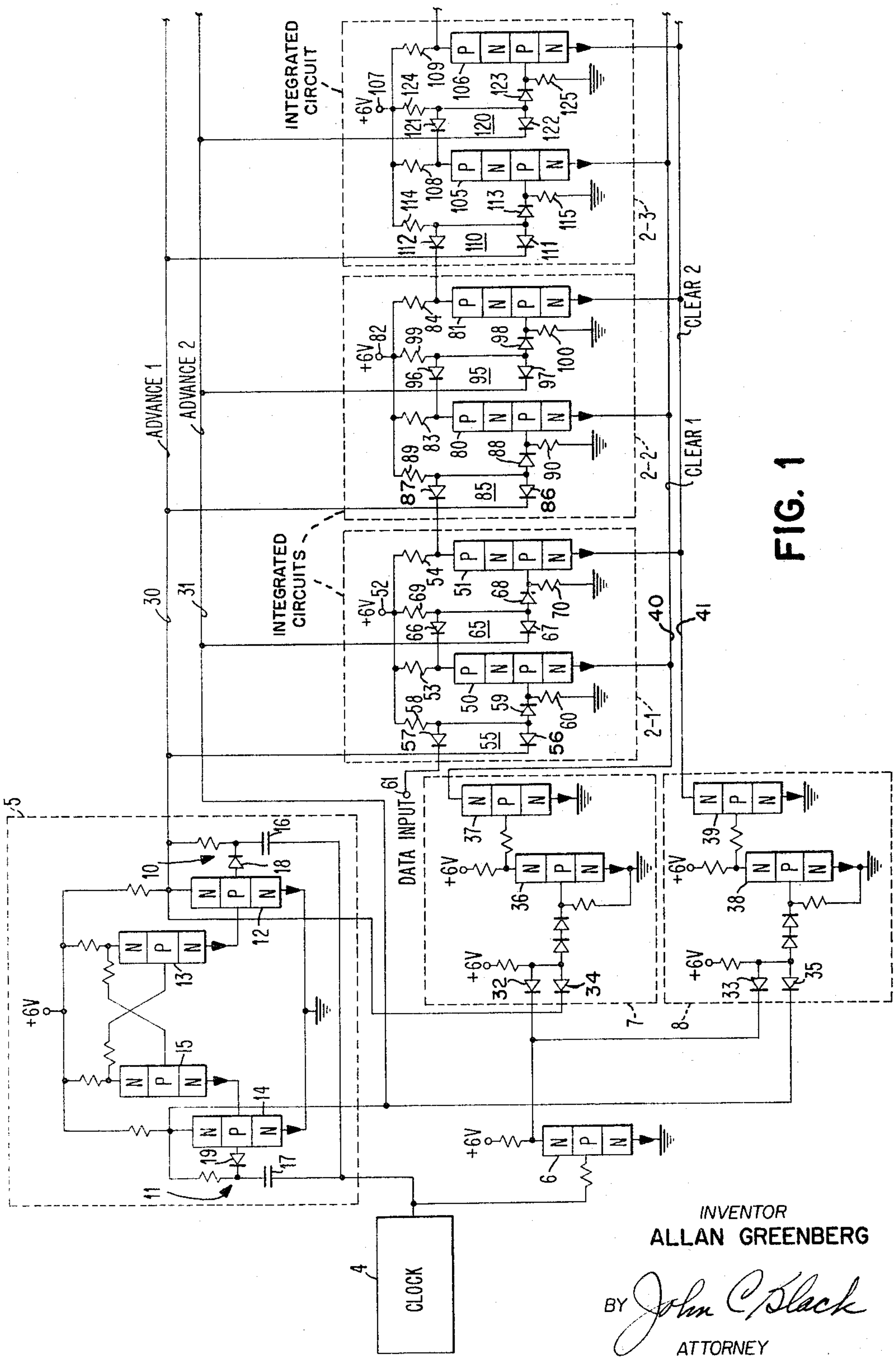

Shift registers are widely used in data processing apparatus, primarily for the temporary storage of data in digital form. As circuit development and packaging techniques advance in the electronic art concerned with the design of such apparatus, the requirements for speed of operation and for fabrication in compact, integrated form at low cost become more severe.

It is a primary object of the present invention to provide an improved shift register which is well suited to fabrication by monolithic techniques, which is low in cost, and which is compatible with and operates reliably at the speed of the logical circuits with which it is utilized.

This object is achieved in the preferred embodiment of the present invention by the use in each of several stages in the shift register of first and second silicon controlled rectifiers. First and second diode AND circuits in each stage form the inputs to the first and second rectifiers. The output of the first rectifier in each pair is connected to the input of the second rectifier in the pair by way of one diode in the second AND circuit. The corresponding diode in the first AND circuit forms the data input of the stage. The other diodes of the AND circuits are connected to respective first and second data advance lines. The output of the second rectifier in each stage forms the stage output. The output of one stage is connected to the input of its next succeeding stage. The first rectifiers in each stage have their cathodes connected to a common control means adapted to interrupt courrent flow in the rectifiers, thereby resetting them to their nonconducting states. The other rectifiers in each stage have their cathodes connected to a second common control circuit adapted to interrupt the rectifier current for resetting the rectifiers to their nonconductive states.

It is therefore a more specific object of the present invention to provide an improved shift register in which stage of the register includes a pair of silicon controlled rectifiers having respective diode AND circuit inputs and having respective set and reset means.

In the present application, the term "silicon controlled rectifier" is used in its broadest sense to include semiconductor devices, whether of silicon or other semiconductor material, which are switched to a conductive state in response to a signal applied to a control electrode and which have an internal regenerative feedback which causes the device to remain in its conductive state if the control signal is removed.

Silicon controlled rectifiers are particularly well adapted to fabrication by monolithic techniques. The techniques for fabricating the rectifiers are similar to those utilized in the fabrication of the diode and transistor logical circuits with which the rectifiers are utilized. As a result, the speed of operation of the rectifiers is not substantially lower than the speed of operation of the diodes and transistors. Accordingly, the shift register of the present application can be operated at speeds which are comparable to those of the associated logical circuits.

It is therefore another object of the present invention to provide a high speed shift register, each stage of which includes a monolithically fabricated structure including a pair of silicon controlled rectifiers and a diode AND circuit for each rectifier.

The foregoing and other objects, features and advantages of the invention will be apparent from the following more particular description of a preferred embodiment of the invention, as illustrated in the accompanying drawings.

Figure 2:
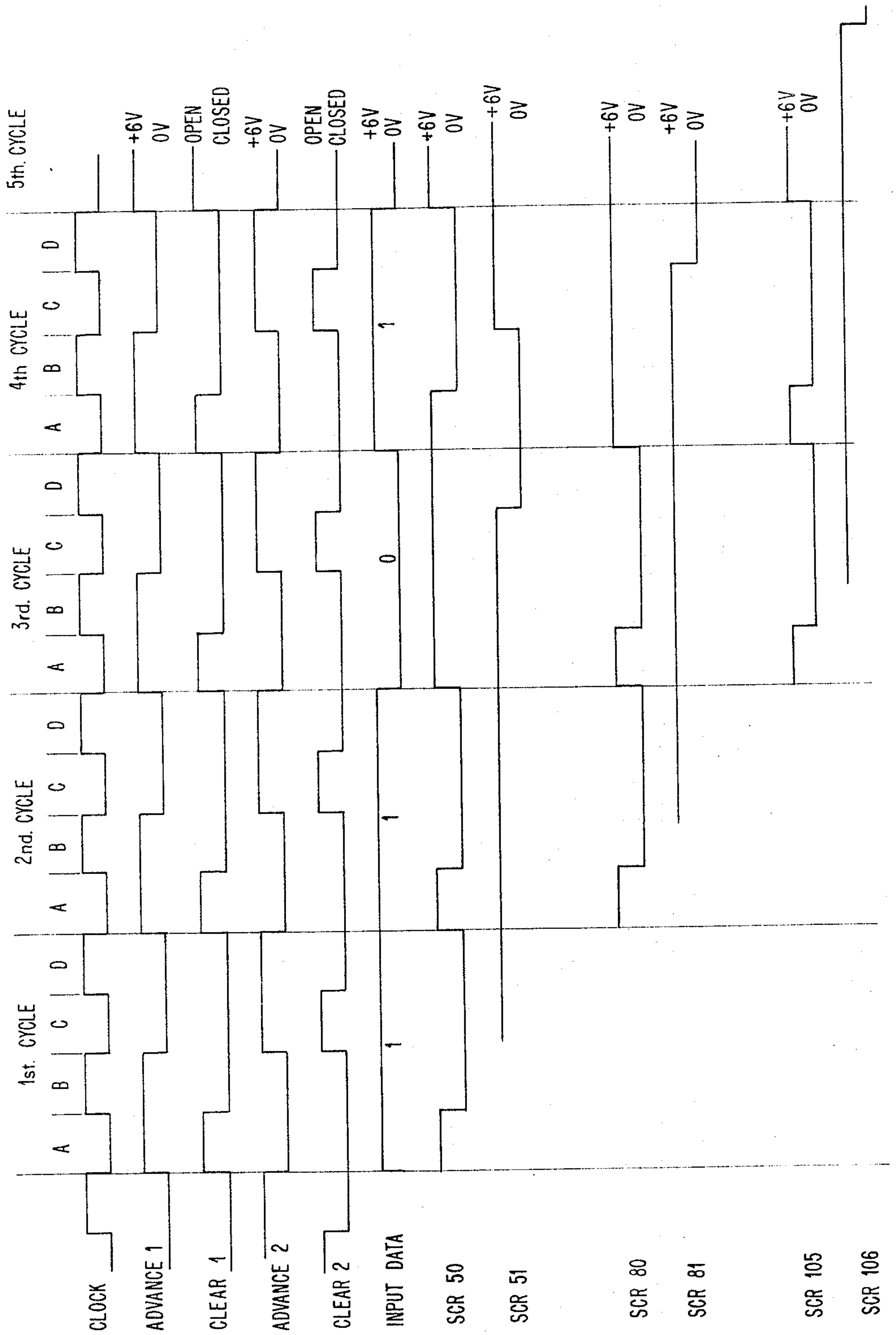

In the drawings:

FIG. 1 is a fragmentary, schematic diagram of a preferred embodiment of the improved register and its control circuit; and FIG. 2 shows preferred wave forms which illustrate the operation of the circuit of FIG. 1.

In FIG. 1, the shift register 1 includes a plurality of stages of which only the first three, 2–1, 2–2 and 2–3 are shown. A control circuit 3 for the register includes a clock 4, a bistable device 5, an inverter 6 and a pair of non-inverting, logical AND circuits 7 and 8.

The clock 4 is of conventional construction and produces a train of square wave signals illustrated in FIG. 2. These signals are applied to the inputs of the inverter 6 and the bistable device 5.

The bistable device 5 is of conventional construction and includes gated input circuits 10 and 11 and transistors 12, 13, 14 and 15. The base and collector electrodes of the transistors 13 and 15 are cross-coupled in the usual manner to provide two stable states of operation. In one state, the transistors 12 and 13 are conducting and the transistors 14 and 15 are nonconducting. In the opposite state, the transistors 14 and 15 are conducting and the transistors 12 and 13 are nonconducting.

The stable state of the device 5 is changed by each negative-going edge of the clock pulses. This negative-going edge is applied to the conducting transistor 12 or 14 by means of the respective capacitor 16 or 17 and the respective diode 18 or 19. When the negative pulse is applied to the base electrode of the conducting transistor 12 or 14, the conducting transistors are turned off. This results in the turning on of other transistors via the cross-coupling connection.

When the transistor 12 is conducting and the transistor 14 is nonconducting, ground potential is applied to the ADVANCE 1 line 30; and the positive supply potential is applied to the ADVANCE 2 line 31. When the transistor 14 is conducting and the transistor 12 is nonconducting, the positive supply potential is applied to the line 30; and ground potential is applied to the line 31.

The output pulses of the clock 4 are inverted by the inverter circuit 6 and are applied to the diodes 32 and 33 of the AND circuits 7 and 8. The lines 30 and 31 are connected to the other diodes 34 and 35 of the AND circuits 7 and 8. The circuits 7 and 8 also include pairs of transistor inverters 36, 37 and 38, 39.

A CLEAR 1 line 40 is connected to the collector electrode of the inverter 37; and a CLEAR 2 line 41 is connected to the collector electrode of the inverter 39.

The shift register stage 2–1 includes a pair of silicon controlled rectifiers 50 and 51. The cathodes of the rectifiers 50 and 51 are connected respectively to the lines 40 and 41. The anodes of the rectifiers are connected to a positive supply terminal 52 by way of resistors 53 and 54.

The control electrode of the rectifier 50 is connected to a logical AND circuit 55 comprising input diodes 56 and 57, a resistor 58, a coupling diode 59 and a resistor 60. The diode 56 is connected to the ADVANCE 1 line 30; and the diode 57 is connected to a data input terminal 61.

The control electrode of the rectifier 51 is connected to a logical AND circuit 65 which includes input diodes 66 and 67, a coupling diode 68 and resistors 69 and 70. The diode 66 is connected to the anode of the rectifier 50; and the diode 67 is connected to the ADVANCE 2 line 31.

The stage 2–2 of the shift register 1 is similar to the stage 2–1 and includes a pair of silicon controlled rectifiers 80 and 81. The anodes of the rectifiers 80 and 81 are connected to a positive supply terminal 82 by way of resistors 83 and 84. The cathodes of the rectifiers 80 and 81 are connected respectively to the CLEAR 1 line 40 and the CLEAR 2 line 41.

The control electrode of the rectifier 80 is connected to a logical AND circuit 85 which includes input diodes 86 and 87, a coupling diode 88 and resistors 89 and 90. The diode 86 is connected to the ADVANCE 1 line 30. The diode 87 is connected to the anode of the rectifier 51, which anode forms the data output terminal of the stage 2–1.

The control electrode of the rectifier 81 is connected to a logical AND circuit 95 which includes input diodes 96 and 97, a coupling diode 98 and resistors 99 and 100. The diode 96 is connected to the anode of the rectifier 80; and the diode 97 is connected to the ADVANCE 2 line 31.

The stage 2–3 includes a pair of silicon controlled rectifiers 105 and 106. The anodes of the rectifiers are connected to a positive supply terminal 107 by way of resistors 108 and 109. The cathodes of the rectifiers 105 and 106 are connected respectively to the CLEAR 1 line 40 and the CLEAR 2 line 41. The control electrode of the rectifier 105 is connected to a logical AND circuit 110 which includes input diodes 111 and 112, a coupling diode 113 and resistors 114 and 115. The diode 111 is connected to the ADVANCE 1 line 30; and the diode 112 is connected to the anode of the rectifier 81, which anode comprises the output data terminal of the stage 2–2.

The control electrode of the rectifier 106 is connected to a logical AND circuit 120 which includes input diodes 121 and 122, a coupling diode 123 and resistors 124 and 125. The diode 121 is connected to the anode of the rectifier 105. The diode 122 is connected to the ADVANCE 2 line 31.

It will be noted that the cathodes of all input rectifiers 50, 80 and 105 of each shift register stage 2–1, 2–2 and 2–3 are connected to the CLEAR 1 line 40. The cathodes of the corresponding input rectifiers (not shown) of succeeding stages (not shown) of the shift register 1 are also connected in common to the line 40. Also, the ADVANCE 1 line 30 is connected to the input diodes 56, 86 and 111 of the AND circuits associated with the input rectifiers 50, 80 and 105 of each input stage. The cathodes of the output rectifiers 51, 81 and 106 of the stages 2–1, 2–2 and 2–3 are connected in common to the CLEAR 2 line 41. The corresponding output rectifiers of succeeding stages (not shown) are also connected to the line 41. The input diodes 67, 97 and 122 of the logical AND circuits associated with the output rectifiers 51, 81 and 106 are connected in common to the ADVANCE 2 line 31. Succeeding stages (not shown) in the register are similarly connected.

Attention is directed to the wave forms of FIG. 2 to clarify the operation of the register 1 and its control circuits 3.

The clock 4 produces a train of square wave pulses of a predetermined frequency. During a complete cycle of operation of the shift register, data is transferred from one stage to the next succeeding stage; and this cycle of operation, which comprises two complete cycles of the output signal of the clock, is divided into four times intervals identified in FIG. 2 as A, B, C and D for convenience.

Each negative-going edge of the clock signal switches the bistable device 5 from one stable state to the other. Thus during one cycle of operation of the register, the bistable device 5 is switched from an initial stable state to the opposite stable state and then back to the initial stable state. Consequently, the complemented outputs of the device 5, illustrated in FIG. 2 as the ADVANCE 1 and ADVANCE 2 signals, are at half the frequency rate of the clock signals.

When the clock output is at its positive level, the inverter 6 applies a negative signal to the diodes 32 and 33, turning the transistor inverters 36 and 38 off. This causes the transistors 37 and 39 to be energized. When the transistors 37 and 39 are energized, the rectifiers 50, 51, 80, 81, 105 and 106 can be operated in their energized, as well as their de-energized, states.

However, when the clock pulses go to their negative level, the inverter 6 applies a positive signal to the diodes 32 and 33. If at this time the line 30 is also positive, the transistor 36 will turn on, causing the transistor 37 to turn off and opening the CLEAR 1 line 40. If any of the rectifiers 50, 80 or 105 are energized at this time, their cathode circuits will be interrupted and said energized rectifiers are reset to their nonconducting state.

If at the time the inverter 6 applies a positive signal to the diodes 32 and 33, the line 31, instead of the line 30 is positive, the transistor 38 will be turned on, thereby turning off the transistor 39 and interrupting the CLEAR 2 line 41 in the cathode circuits of the rectifiers 51, 81 and 106. The positive levels of the CLEAR 1 and CLEAR 2 signals (FIG. 2) illustrate the reset times for the respective rectifiers 50, 80, 105 or 51, 81, 106.

Therefore, during cycle times A and C (FIG. 2), the CLEAR 1 and CLEAR 2 lines are opened respectively to force their associated rectifiers 50, 80, 105 and 51, 81, 106 to their off states. During the cycle times B and D (FIG. 2), the ADVANCE 1 and ADVANCE 2 lines are effective respectively to set their associated rectifiers 50, 80, 105 and 51, 81, 106 to their on or off states in accordance with the value of the logical data signals at their input diodes 57, 87, 112 and 66, 96, 121.

It is assumed for purposes of illustration that the logical "1" and "0" data bits are represented respectively by positive and ground signal levels. A logical "1" bit at an input diode 57, during B time, will turn on the rectifier 50; and the rectifier will remain on until the next succeeding A time.

Note, however, that the logical "1" bit is now inverted since it appears at the anode of the energized rectifier as ground potential.

The inverted signal is applied to the input dode 66 of the rectifier 51. During D time, a positive signal is applied to the input diode 67 via the ADVANCE 2 line; however, ground potential at the diode 66 prevents the rectifier from turning on.

The logical "1" signal therefore, appears in non-inverted form at the anode of the rectifier 51 at D time.

Similarly, if the inputs to the diodes 87 and 112 are at their relatively positive levels at B time, the rectifiers 80 and 105 are turned on. During D time, the rectifiers 81 and 106 are held off.

A logical "0" signal at the input terminal 61 during B time causes the rectifier 50 to remain off, applying a positive potential to its anode. When this data bit is transferred from the rectifier 50 to the rectifier 51 during D time, it is again inverted, that is, the rectifier 51 is turned on to apply ground potential to its anode.

When data signals are transferred to the stage 2–2, they are stored in inverted form in the rectifier 80 during B, C and D times; and during D time (and during A and B times of the next cycle), they are stored in the rectifier 81 in non-inverted form. As the logical data progresses through succeeding stages, it becomes stored first in inverted form, and then in its non-inverted form in the first and second rectifiers of each stage. This is illustrated in FIG. 2.

Preferably the components of each stage are fabricated on a single semiconductor wafer or chip by monolithic techniques. It will be appreciated that a two-transistor equivalent of the silicon controlled rectifier may be utilized in lieu of the rectifier. It will also be appreciated that rectifiers which are turned off by control pulses rather than by anode-cathode current interruption can be used.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A data storage device comprising a shift register having a plurality of stages, each stage including first and second bistable silicon controlled rectifiers having respective inputs and outputs and having first and second logical AND circuits, each AND circuit including an output connected to the input to a respective rectifier, and each including a first and a second diode input, the second input of the first AND circuit forming the data input to the stage and the second input of the second AND circuit being connected to the output of the first rectifier;

means for applying operating potentials to the rectifiers, and a control circuit for the register including first and second advance lines connected respectively to the first inputs of the first and second AND circuits of each stage;

a bistable device having a pair of complemented outputs connected respectively to the first and second advance lines;

a source of clock pulses for switching the bistable device from one stable state to the other in response to succeeding clock pulses; and means including a pair of logical AND circuits responsive to the clock pulses and to the outputs of the bistable device for momentarily interrupting the operating potential of the first and then the second rectifiers of each stage alternately during succeeding clock cycles;

the outputs of the bistable device effective upon the termination of the operating potential interruption for transferring data into the first rectifier and then into the second rectifier in response to a pair of succeeding clock pulses.

2. The storage device of claim 1 wherein each shift register stage is monolithically fabricated on a semiconductor chip.

3. A data storage device of the type in which a shift register includes a plurality of data storage stages and in which timing means including sources of out-of-phase advance pulses and including reset means control the register so as to advance binary data from stage to stage through the register, wherein each stage comprises first and second bistable silicon controlled rectifiers, each having an anode and a cathode adapted for connection with a source of operating potential and each having a control electrode; and first and second diode AND circuits having first and second outputs connected respectively to the control electrodes of the first and second rectifiers;

said AND circuits including first inputs, each connected to a respective source of out-of-phase advance pulses and including second inputs;

the second input of the first AND circuit forming the data input of the stage, the second input of the second AND circuit being connected to the anode of the first rectifier, the anode of the second rectifier forming the data output of the stage.

4. The storage device of claim 3 wherein the register stages are monolithically fabricated on a semiconductor chip.

5. The storage device of claim 3 wherein the reset means are effective for disconnecting alternately the cathodes of the first and second rectifiers of the stages from the source of operating potential prior to the entry of new data into the respective rectifiers.

6. A data storage device of the type in which a shift register includes a source of operating potential and a plurality of data storage stages and in which timing means including sources of out-of-phase advance pulses and out-of-phase reset means effective during the initial portions of respective advance pulses controls the register so as to advance binary data from stage to stage through the register, wherein each stage comprises first and second bistable silicon controlled rectifiers, each having an anode, a cathode and a control electrode;

means including the out-of-phase reset means for connecting the anodes and cathodes to the source of operating potential; and first and second diode AND circuits having first and second outputs connected respectively to the control electrodes of the first and second rectifiers;

said AND circuits including first inputs, each connected to a respective source of out-of-phase advance pulses and including second inputs;

the second input of the first AND circuit forming the data input of the stage, the second input of the second AND circuit being connected to the anode of the first rectifier, the anode of the second rectifier forming the data output of the stage.

7. A data storage device comprising a clock producing a train of pulses;

a bistable device having first and second complemented outputs responsive to each clock pulse for changing its state, thereby producing out-of-phase first and second output pulses at half the frequency rate of the clock;

first and second logical circuits including first and second transistor switches and responsive to the clock pulses and to the first and second output pulses of the bistable device respectively for turning the first and second transistors off only during an initial portion of first and second output pulses of the bistable device respectively; and a multi-stage shift register, each stage including first and second silicon controlled rectifiers, each having an anode, a cathode and a control electrode, a source of operating potential for the rectifiers, means including the first and second transistor switches respectively connecting the first and second rectifiers of each stage to the source of operating potential for resetting the first and second rectifiers of each stage during said initial portions of the first and second output pulses of the bistable device respectively, and first and second diode AND circuits having first and second outputs connected respectively to the control electrodes of the first and second rectifiers, having second inputs and having first inputs connected respectively to the first and second outputs of the bistable device for operating the first and second rectifiers in accordance with input data at the respective second inputs after said initial portions of the first and second output pulses of the bistable device, the second input of the first AND circuit forming the data input of the stage, the second input of the second AND circuit being connected to the anode of the first rectifier, the anode of the second rectifier forming the data output of the stage.

References Cited

UNITED STATES PATENTS

| | | | |
|---|---|---|---|
| 3,041,476 | 6/1962 | Parker | 307—88.5 |
| 3,168,657 | 2/1965 | Wells | 307—88.5 |

ARTHUR GAUSS, *Primary Examiner.*

J. ZAZWORSKY, *Assistant Examiner.*